United States Patent [19]
Hughes

[11] Patent Number: 5,050,173
[45] Date of Patent: Sep. 17, 1991

[54] LOOPED, PHASED ARRAY LASER OSCILLATOR

[75] Inventor: John L. Hughes, Glen Waverley, Australia

[73] Assignee: Phased Array Lasers Pty Ltd., Melbourne, Australia

[21] Appl. No.: 477,879

[22] PCT Filed: May 3, 1989

[86] PCT No.: PCT/AU89/00190
§ 371 Date: Apr. 16, 1990
§ 102(e) Date: Apr. 16, 1990

[87] PCT Pub. No.: WO89/11172
PCT Pub. Date: Nov. 16, 1989

[30] Foreign Application Priority Data

May 3, 1988 [AU] Australia ................................ PI7995

[51] Int. Cl.⁵ ............................................. H01S 3/07
[52] U.S. Cl. .......................................... 372/6; 372/66; 372/75; 385/115
[58] Field of Search ...................... 372/6, 75, 66, 92; 350/96.15, 96.24

[56] References Cited

U.S. PATENT DOCUMENTS 3,471,215 10/1969 Snitzer .............................. 350/96.24
4,682,335 7/1987 Hughes .................................. 372/6
4,835,778 5/1989 Kafka et al. ........................... 372/92

FOREIGN PATENT DOCUMENTS 9000320 1/1990 Australia ................................. 372/6

Primary Examiner—Frank Gonzalez
Assistant Examiner—Susan S. Morse
Attorney, Agent, or Firm—Dvorak and Traub

[57] ABSTRACT

A phase-locked fibre bundle laser oscillator made up of one or more active fibre loops as illustrated. The single mode fibre has a doped core surrounded by cladding and has its ends positioned in a common plane forming a two core aperture which is optically polished to a twentieth wavelength. Fibre end faces are coupled by index matching material to a single, partially transmitting, dielectric mirror and the oscillator is side pumped via the output of an array of laser diodes.

6 Claims, 7 Drawing Sheets

FIG. 5
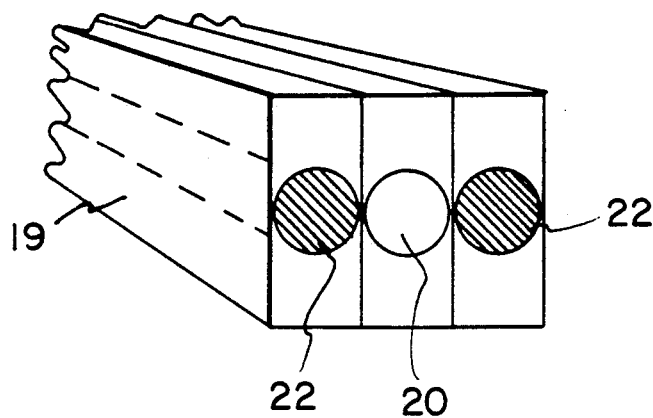
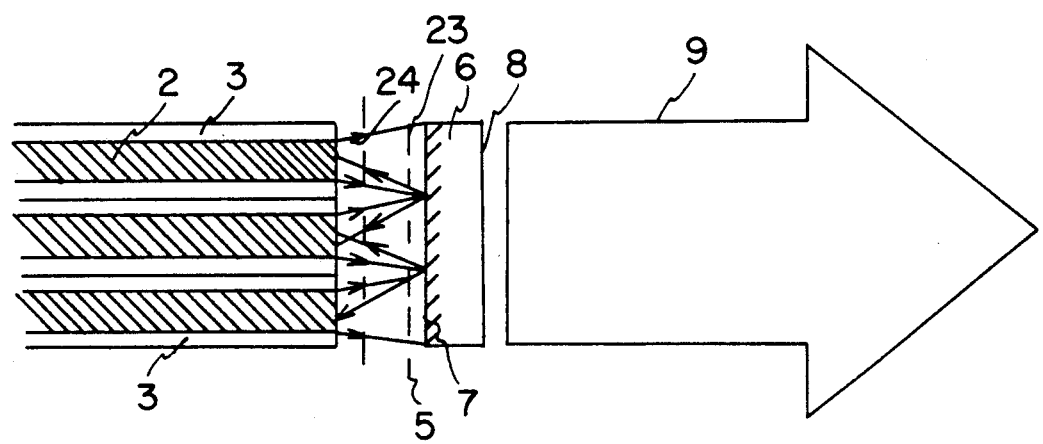
FIG. 6
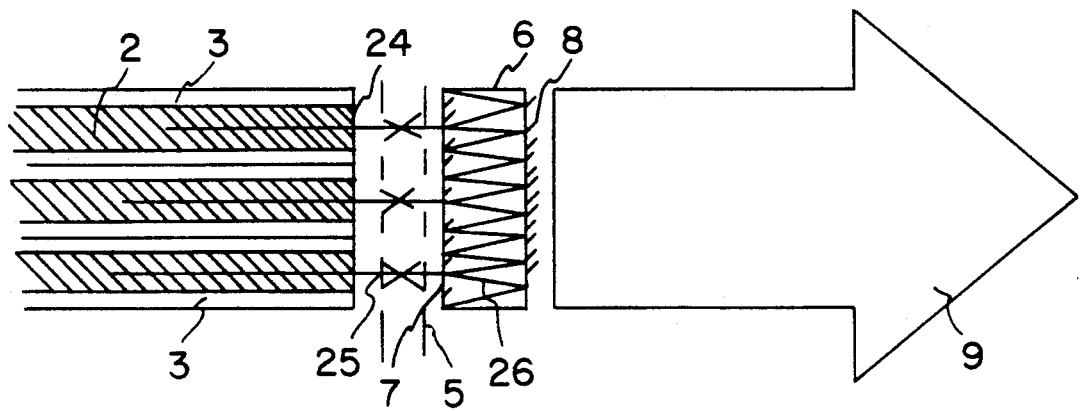
FIG. 7

LOOPED, PHASED ARRAY LASER OSCILLATOR

FIELD OF THE INVENTION

This invention relates to a laser oscillator system whose basic building block is a side excited looped, lasing ion doped fiber laser oscillator with a single mirror, index matched to the output ends of said fiber loop. The invention is scaleable to any practical power level simply by adding together the said looped fiber laser oscillators to form a phased-locked bundle of said oscillators all index matched to a single output mirror. The invention has applications in the medical, industrial and defence fields where a scaleable source of diffraction limited, laser beam energy is required, in particular where its high structural flexibility is an advantage.

SUMMARY OF PRIOR ART

Prior art fiber bundle laser oscillators possessed two mirrored ends which could move independently of each other and said ends had to be optically treated separately. Prior art fiber bundle laser oscillators were excited either via one of the said two ends of via laser media inserted into said fibers in the core where undoped fibers were used. The optical excitation of prior art fiber bundle laser oscillators was very restricted because the diode pumps had to be matched to the very small fiber cores at the ends of said bundle. In the case of laser sources being inserted into a bundle of undoped fiber, a complex assembly procedure had to be followed which significantly increased the cost of said laser oscillator systems.

The present invention overcomes the complex and expensive assembly and operational costs of prior art fiber bundle based laser oscillator systems by providing simple side excitation of a large number of laser ion doped, looped fibers simultaneously. In applications where only an unswitched laser beam is required, that is, in applications demanding only a continuous or pulsed laser output beam with no selective switching of the individual fibers, the present invention provides a major advance on prior art fiber bundle laser systems providing a cost effective means of generating a laser beam which is scaleable in power simply by adding more fiber loops to the bundle and providing additional diode excitation sources for the side excitation of said bundle via a simple, direct, side illumination of said fiber bundle.

The present invention is relatively simple to manufacture in comparison with prior art laser oscillator systems. A single mode, optical fiber doped with the appropriate lasing ion, is simply wound onto a rotating drum and automatically moved by the stacking action which provides a coherently packed reel of optical fibers. Once the thickness of the said optical fiber layers have built up on the drum, which has to be of a diameter which is far greater than the thickness of the fiber layers, the said layers of coherently packed, and the doped optical fibers are cut along the axis of rotation of said drum so that the required looped fiber laser bundle is automatically produced as the fiber layers are moved from said drum. By bringing the two free ends of said fiber bundle together into a common aperture and optically polishing said aperture and index matching it to a single laser output mirror, the invention can be completed in a relatively short time as far as the manufacture of one of its major components is concerned. The invention is scaleable to any practical power level because its size simply depends on the size of the drum used in the manufacture and the length of fiber wound onto said drum.

BACKGROUND OF THE INVENTION

These are two approaches that can be taken to the generation of a laser beam within laser oscillators either the laser oscillator's active medium is excited as a whole or the active medium can be split into a large number of sections, the laser beam output of each of the said sections being then phased-locked together to produce a single beam equivalent to that emitted by the single section medium laser oscillator.

Two development avenues have resulted in the techniques necessary to generate a single laser beam by phase-locking the output beam of a large number of smaller laser beam emitting apertures, namely, fiber bundle laser arrays and arrays of semiconductor lasers. The fundamental difference between these two development avenues is the fact that the fiber laser aperture array is a cold array, involving only the transmission of the laser light through the said aperture whilst the semiconductor array aperture is a hot aperture because up to 75% of the electrical energy into said aperture is deposited as heat energy with in the said aperture, only about 25% of said electrical energy being converted to laser light within the diode array. Although phase-locking of semiconductor arrays is now well established, no reports are to hand that suggest such diode arrays have coherently phased-locked on a large scale, that is large diode arrays phased-locked in pockets across the aperture, a process that leads to a severe degrading of the structure of the emitted laser beam.

The inventor has pioneered key aspects of fiber bundle based phased-array lasers since 1963 when a team set up by the British Government consisting of microwave radar pioneers and laser physicists was stationed at The Royal Radar Establishment, Malvern, UK, to determine the avenues along which conventional radar techniques could be used to develop laser radar. One of the avenues studied was that for the transfer of microwave, phased-array radar techniques into the optical region and optical fiber bundles were assessed experimentally for this task by the inventor at the Royal Radar Establishment as early as 1963. However, these early experimental tests revealed that a helium-neon laser beam was converted into "non-laser light" as soon as it entered the fiber bundles available in those days and the development of fiber bundle based phased-array laser radars was held up until single mode optical fibers became available some seventeen years later during the late 1970's. A key process in phased-array laser radar utilizing bundles of single mode optical fibers was published in 1979 (Hughes and Ghatak, applied Optics, U.S.A., 1979).

Early phased-array laser radar patents by the inventor were classified by the US patent Office in June 1983 and remain classified. However, a commercially orientated phased-array, fiber bundle laser oscillator consisting of undoped optical fibers was patented in the United States in 1987 (U.S. Pat. No. 4,682,335 Hughes, July 1987). However, the prior art, fiber bundle based, phased-array lasers were difficult to assemble compared to the relative simplicity of the present invention which lends itself to simple, but highly effective mass production techniques.

The first of our looped, neodymlun doped fiber lasers was constructed and operated under contract from the assignee by YORK TECHNOLOGY Ltd of Southampton, UK in 1988. However, the individual looped fiber lasers in the 20 bundle system manufactured by YORK under contract to the assignee were side excited with a 830nm laser diode output coupled into the core of each of the looped laser oscillators in the bundle of said oscillators via a commercially available optical coupler manufactured by YORK TECHNOLOGY Ltd for the optical communications market. Unfortunately, such couplers are expensive and are not appropriate in the low cost, unswitched, diode excited looped, fiber laser bundler based laser oscillator of the invention. For example, when one packs the fiber bundle so that the fibers are in contact with each other, they represent a solid block of glass in most respects, in particular from the viewpoint of direct optical excitation. The fact that the fibers used to date have a 5 micron diameter doped core and an 80 micron diameter cladding does not affect the optical pumping because the volume of the fiber cores being excited is the beam as if the excitation light was coupled into each individual fiber with an array of very expensive optical couplers.

To achieve coherent phase-locking of the present invention is a much simpler process than is generally thought. For example, the length of the fiber loops in the individual fiber laser oscillators need not be the same, the critical length is that corresponding to a 360 degree phase change, that is the one corresponding to a complete laser wavelength within the fiber core. If the compacted end face of the invention is optically polished to say a twentieth wavelength and index matched to the output mirror surface also polished to a twentieth wavelength, then the effective optical path of all the loops irrespective of their individual physical lengths, will be equal to a twentieth of a wave and well suited for coherent phase-locking of the fiber end array. It should also be noted that the supermode of operation resulting in the coherent phase-locking of the array, is paralleled over the number of loops and is not seriesed over the total length of the loops. In other words, the mean length of the loops represents the fiber length over which the supermode has to be maintained. Furthermore, the broad gain curve of the doped glass fibers used means that the supermodes in different looped fibers can differ in wavelength. In other words, supermode pulling effects in individual fibers can also contribute to coherent phase-locking across the aperture of the invention.

To minimize the cost of manufacturing the invention, it is an advantage to be able to use the optical fiber manufactured worldwide for optical communications needs. These fibers generally have a core diameter of about 5 microns with a cladding diameter of about 125 microns. Such thick cladding is necessary to minimize the optical signal loss from the signal transmitting core of the fiber. Such thick cladding also protects the said fiber core from mechanical damage, a base 5 micron diameter core being extremely fragile. By design there is not transverse optical coupling between such fiber cores in an array of such fibers so that the phase-locking process has to be achieved either by reflective or refractive coupling, a combination of both and some transverse optical coupling via the index matching material be it liquid or solid. The invention can be Q-switched using techniques known in the art. In particular a thin film of slid dye switch placed within the index matched material can accomplish such switching of the invention. Experiments using the invention have also shown that its output laser beam can be modulated by modulating the excitation light.

OBJECTS OF THE INVENTION

It is an object of the invention to produce a phased-array laser oscillator by stacking together in a bundle, a number of optically side excited looped fiber laser oscillators whose ends faces forming the output aperture array are all indexed matched to a single, optically polished output mirror.

Another object of the invention is to spread out the fiber laser bundle so as to minimize heating effects due to heat generated within said bundle during the lasing process.

A further object of the invention is to arrange the bundle of looped fiber lasers such that they represent a long solid slab of fibers allowing for their efficient, direct optical excitation.

Yet a further object of the invention is to fully utilize the thickly clad optical fiber manufacture for world wide optical communication applications, with appropriate laser ion doping of its core.

It is an object of the invention to provide a flexible body for the invention which can be attached to such items as robotic arms without the use of prior art articulated arms.

SUMMARY OF THE INVENTION

A better understanding of the invention may be obtained from the following considerations taken in conjunction with the drawings which are not meant to limit the scope of the invention in any way.

Figure 4:
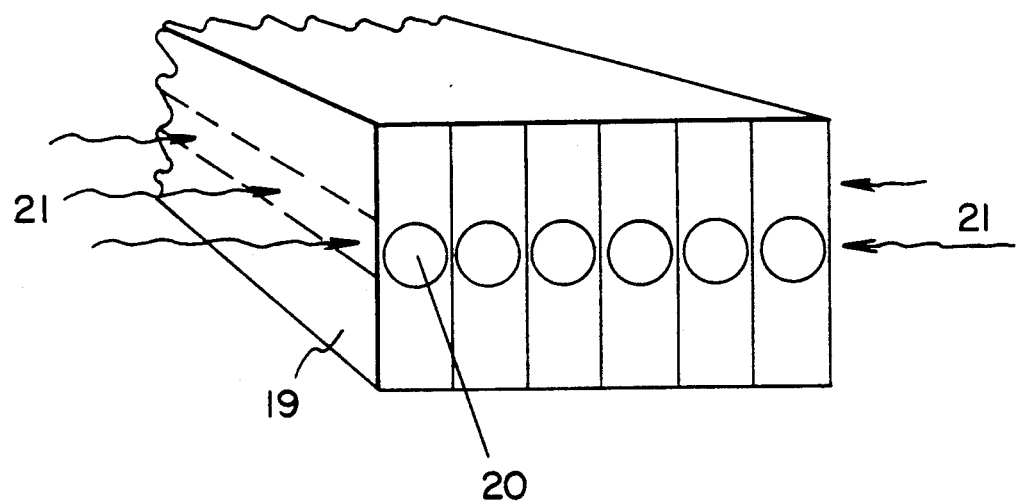

FIG. 4 shows the manner in which portions of the looped fibers of the invention can be polished to produce a rectangular cross-section cladding in which the circular core of the mass produced optical fiber is embedded, being adequately protected in the process. This configuration of the optical fibers allows for the close packing of said fibers in a manner that allows efficient side coupling of the excitation light directly into cores of said fibers.

FIG. 5 shows the manner in which excitation can be coupled into said fiber core of a given looped fiber via one or more optical fibers connected to laser diode arrays emitting the pump light.

FIG. 6 shows reflecting coupling means used to phase-lock the fiber end transmitters forming the inventions output aperture.

FIG. 7 shows he refractive coupling that can be used to phase-lock the fiber end transmitters from the output aperture of the invention.

Figure 8:
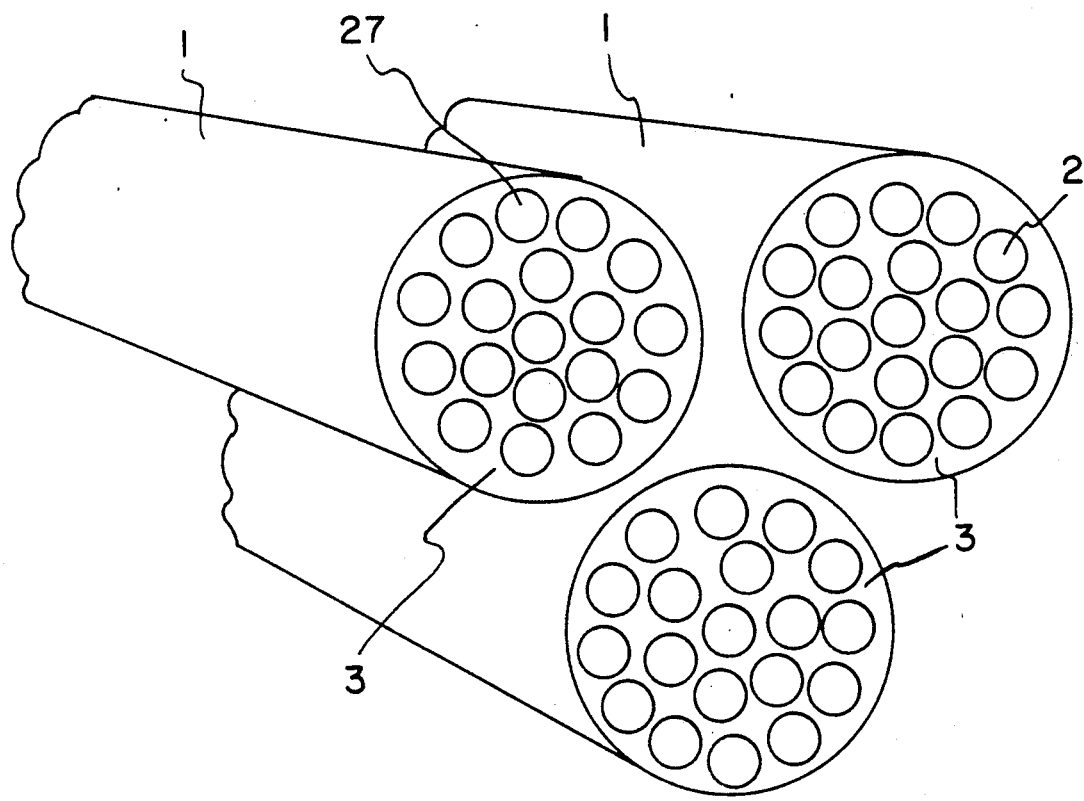

FIG. 8 shows the multicored fibers that can be used to increase the number of individual laser fiber core transmitters in the output aperture.

Figure 9:
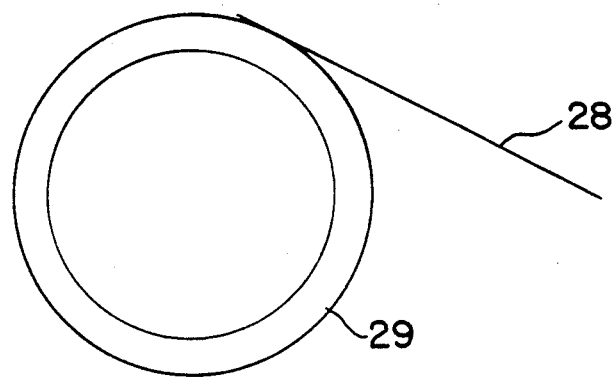

FIG. 9 shows the drum used to coherently stack the doped optical fiber as it emerges from the fiber puller.

Figure 10:
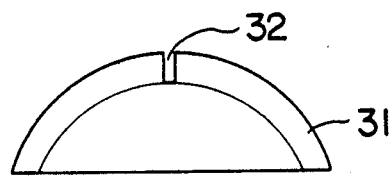

FIG. 10 shows the way in which layers of the coherently stacked doped optical fiber is cut to form the fiber bundle of the invention.

Figure 11:
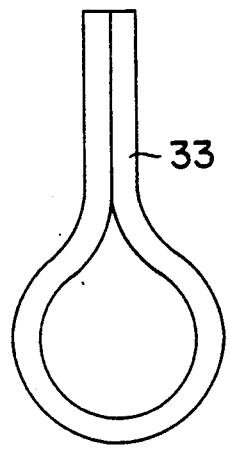

FIG. 11 shows the manner in which the looped fiber bundle comes off the drum in the configuration required for mass producing the invention.

DETAILED DESCRIPTION OF THE INVENTION

Figure 1:
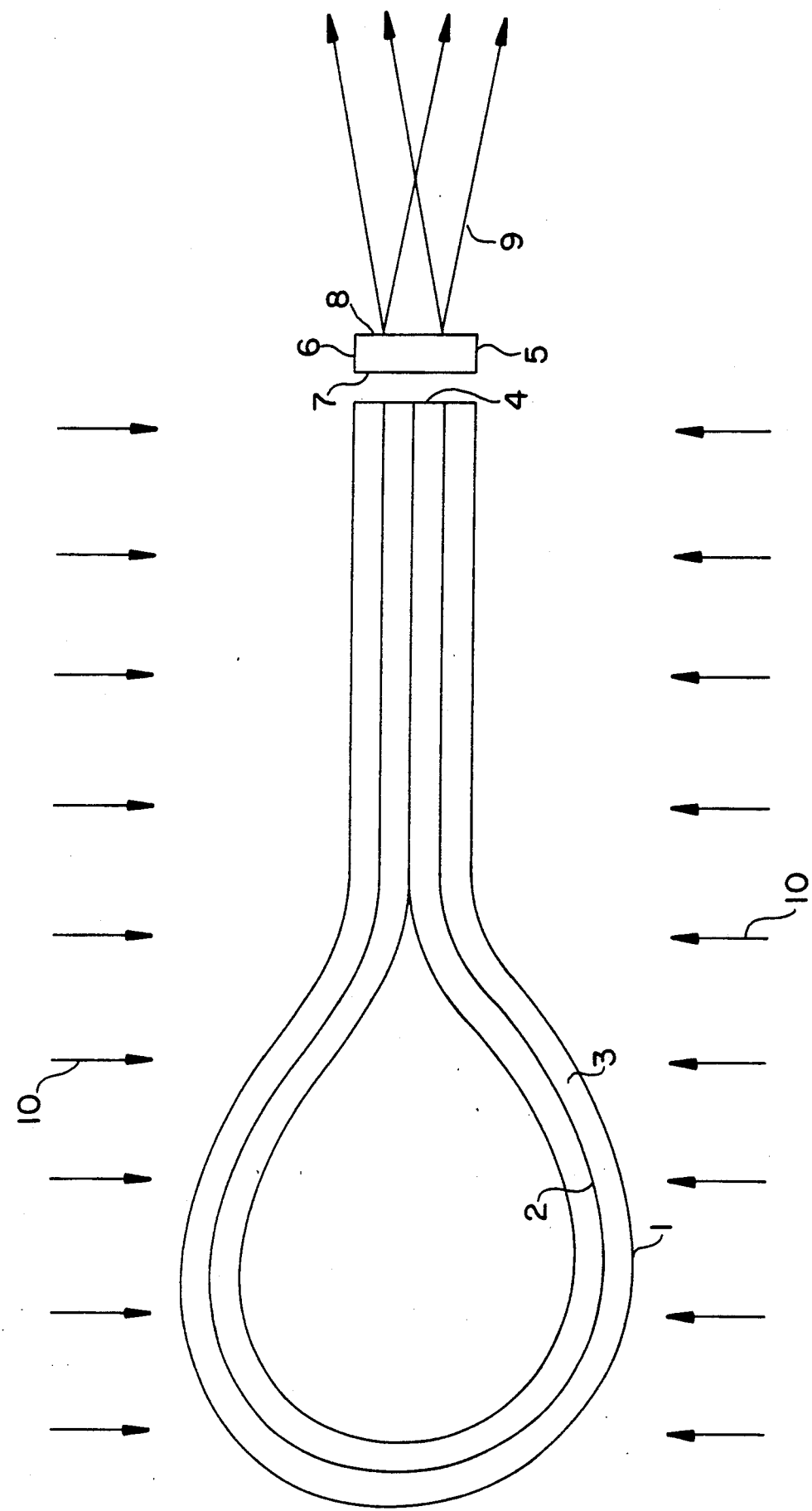
FIG. 1 shows the fundamental building block of the invention, namely, the looped fiber laser oscillator with its phased-locked output beam and its side excitation.

In FIG. 1, numeral 1 indicates a single looped fiber laser oscillator, the building block of the present invention. Numeral 2 indicates the core of the single mode optical fiber, which, for example in the case of neodymlun doping is 500 parts per million, in the fiber core, which for a single mode fiber is about 5 microns in diameter. The absorption path of the 830nm excitation light along the core of such fibers is over two meters. Numeral 3 indicates the cladding surrounding the single mode fiber core. In the case of mass produced single mode optical fiber for optical communications, the diameter of the cladding is normally 125 microns or 25 times core diameter. The thicker the fiber cladding the fewer fiber ends that can be packed into the output aperture of the invention. It is a relatively simple process o mass produce single mode doped fiber with a cladding diameter of 80 microns but an extremely difficult task to mass produce such optical fiber with a cladding diameter of much less than 80 microns, particularly if the cladding has to be etched.

in FIG. 1, numeral 4 indicates the two core aperture of the single looped fiber laser oscillator which is optically polished to a twentieth wavelength. Numeral 5 indicates the index matching material to couple the fiber end faces 4 to an optically polished laser output mirror indicated by numeral 6. Numeral 7 indicates the optically polished and partially mirrored surface of substrate etalon 6. The outer surface of the etalon, indicated by numeral 8 can either be antireflection coated or coated to form a Fabry-Perot resonator. Numeral 9 indicates the phased-locked output of the single looped fiber laser oscillator of the invention. Numeral 10 indicates the optical radiation used to side excite the looped fiber 3.

Figure 2:
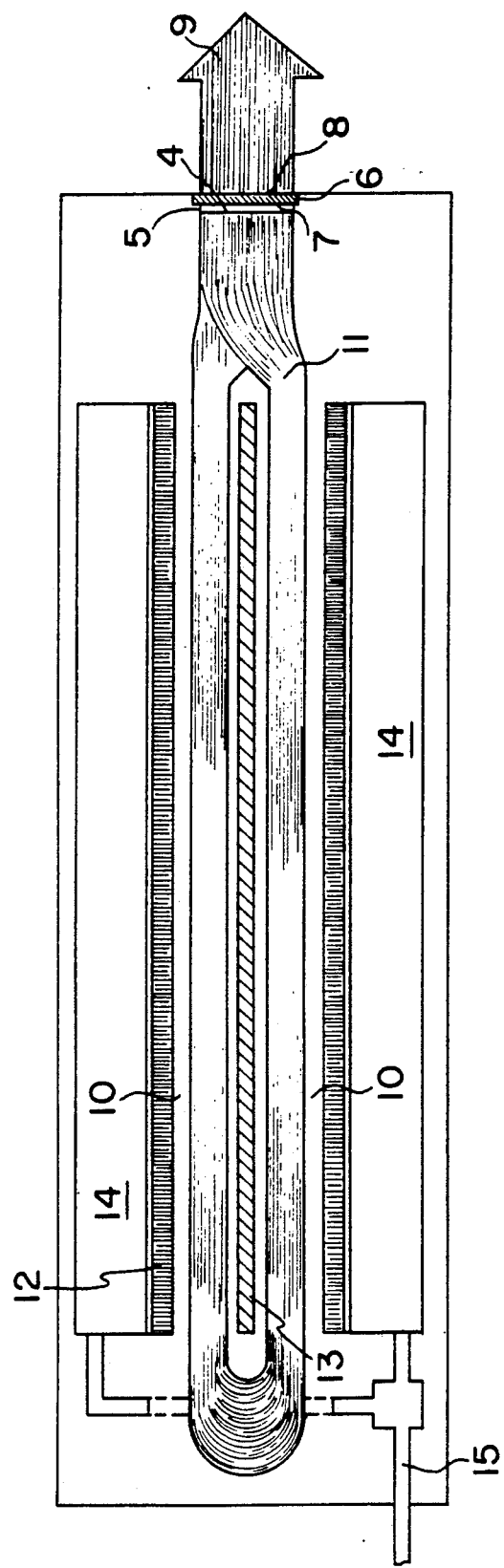
FIG. 2 shows the configuration of the invention after a large number of the looped fiber lasers have been bundled together and the side optical excitation is provided by two arrays of laser diodes and an intervening mirror which reflects any incident pump light back into the fiber bundles.

In FIG. 2, numeral 11 indicates the looped fiber laser bundle of the invention. Numeral 12 indicates the laser diode arrays used to generate the excitation light for the side pumping of the bundle 11. Numeral 13 indicates a mirror reflecting the excitation light that may be incident on it back into bundle 11 to increase the excitation efficiency of the invention. Numeral 14 indicates the power supply for the laser diode array 12 whilst numeral 15 indicates the input for power supply 14.

Figure 3:
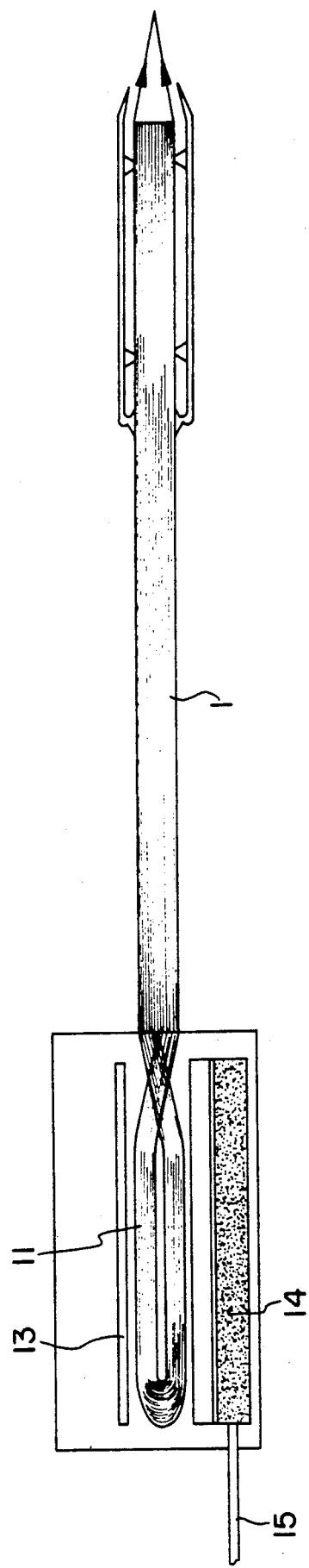
FIG. 3 shows a preferred embodiment of the invention with the side excitation taking place near one end leaving the other, output beam end, highly flexible and capable of being hand held or machine mounted.

In FIG. 3, numeral 16 indicates the extended portion of fiber laser bundle 11 which allows fore greater flexibility of the hand held portion of the invention which is located in the casing indicated by numeral 17. Numeral 18 indicates the focused output beam of the invention necessary for applications in the medical and industrial fields where high beam intensities are required for cutting, for example.

In FIG. 4, numeral 19 indicates the fiber cladding polished into a rectangular configuration. Numeral 20 indicates the doped fiber core of circular cross-section embedded in the polished cladding 19. The cores 20 can be stacked together in a close packed array which can be very effectively optically excited via the side excitation indicated by numeral 21.

In FIG. 5, numeral 22 indicates the core of an optical fiber which can couple excitation light from a remotely sited diode stack into the doped fiber core.

In FIG. 6, numeral 23 indicates the laser beams emerging from the fiber core ends indicated by numeral 24 and reflected from core to core via reflection off mirror 7.

In FIG. 7, numeral 25 indicates the outputs of fiber core ends 24 being refractively coupled from core to core via the Farbry-Perot etalon indicated by numeral 26.

In FIG. 8, numeral 27 indicates one of the fiber cores contained within cladding 3 of fiber 1 in its multicored configuration.

In FIG. 9, numeral 28 indicates the single mode optical fiber being fed into its pulling station so as to be coherently wound on the rotating drum indicated by numeral 29 to build up fiber layers indicated by numeral 30.

In FIG. 10, numeral 31 indicates the coherently packed fiber layers on drum 29 being cut along the axis of rotation of drum 29.

In FIG. 11, the mass produced bundle of looped fiber lasers after being taken off drum 29.

The invention has wide application in the medical, industrial and defence fields where a laserbeam of easily scaleable power output is required from a flexible body. By selecting the appropriate diode pump and fiber core doping it is possible to operate the laser over a wide range of output wavelengths form the visible to the infa-red regions of the electromagnetic spectrum. By frequency doubling, tripling and quadrupling the fundamental output frequency, and by controlling the temperature of the excitation diode lasers it is possible to tune the frequency shifted outputs of the invention further.

The power output of a single looped fiber laser can be as high as 10 milliwatts and 10,000, 80 micron thick clad fibers can be packed into an aperture of a square centimeter. This implies that a continuous laser beam power of 100 watts per $cm^2$ of the aperture can be emitted by the laser using mass produced optical communications fiber.

Under pulsed operation, peak powers of our fiber cores per square centimeter can be extracted out of a single core using short duration pulses so that their is ample scope for high peak power outputs form the invention as a whole provided it is Q-switched or modelocked using techniques which are well known in the art.

Modification may be made to the above teachings by those skilled in the art without departing from the scope and spirit of the invention.

I claim:

1. A scaleable phased locked single aperture, single mirror looped fiber laser bundle oscillator with the optically polished ends of the said fiber laser oscillator loops positioned to form the said single output aperture and optically matched to the said single, optically polished mirror which partially transmits at the laser wavelength, said fiber laser loop oscillators being optically excited using arrays of semiconductor light sources.

2. A laser oscillator system as claimed in claim 1 where the optical excitation is restricted to the region half way along the said loop of said fiber laser bundle oscillator allowing the said flexible single output aperture end of said oscillator to be free for ease of handling and mounting onto industrial work stations.

3. A laser fiber laser as claimed in claim 1 where two sides of the fiber cladding has been polished to form a cladding of rectangular cross-section whose width matches the diameter of the fiber core of circular cross-section embedded in said polished cladding.

4. A series of closely packed optical fibers as claimed in claim 3 where the cores are in close contact with each other in a given plane allowing for effective coupling of the excitation light output from the laser diode exciters into a closed packed array of fiber cores.

5. A bundle of polished optical fibers as claimed in claim 3 wherein the excitation light propogating in one of the said fiber cores is coupled into the laser fiber core which is positioned as near as possible to the said fiber core in which the excitation light propagates.

6. A fiber laser oscillator as claimed in claim 1 where the fiber cladding has several laser fiber cores embedded in it to inclose the excitation efficiency an to increase the density of the output core transmitter in the output aperture for a given number of clad optical fibers.

* * * * *